March 10, 1931.  P. B. FLANDERS  1,795,647
METHOD AND APPARATUS FOR MEASURING ACOUSTICAL IMPEDANCES
Filed Feb. 19, 1929   2 Sheets-Sheet 1

INVENTOR
P. B. FLANDERS
BY
G. H. Stevenson
ATTORNEY

March 10, 1931.    P. B. FLANDERS    1,795,647
METHOD AND APPARATUS FOR MEASURING ACOUSTICAL IMPEDANCES
Filed Feb. 19, 1929    2 Sheets-Sheet 2
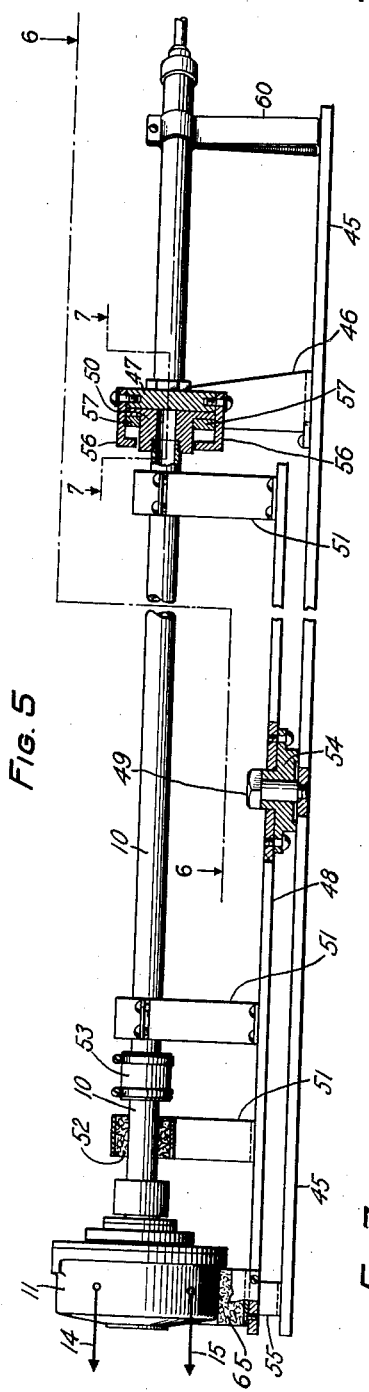
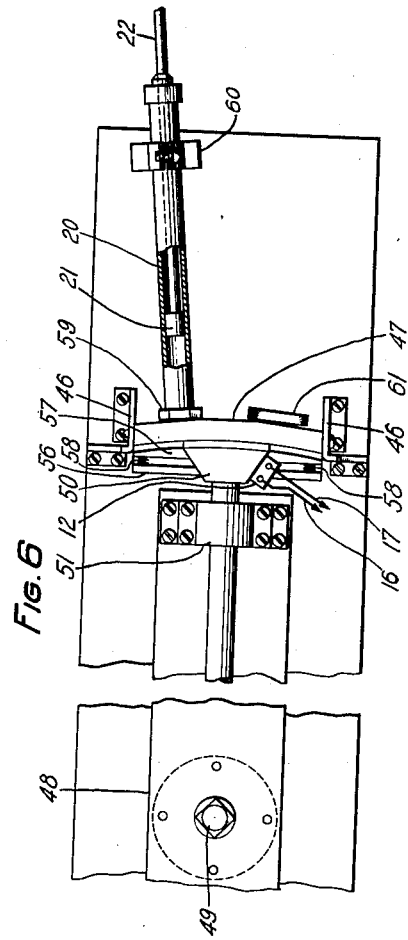
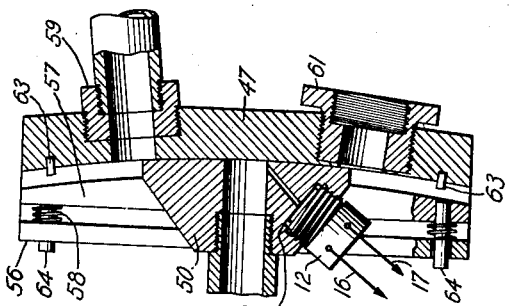
INVENTOR
P. B. FLANDERS
BY
G. H. Stevenson
ATTORNEY Patented Mar. 10, 1931

1,795,647

UNITED STATES PATENT OFFICE

PAUL B. FLANDERS, OF EAST ORANGE, NEW JERSEY, ASSIGNOR TO BELL TELEPHONE LABORATORIES, INCORPORATED, OF NEW YORK, N. Y., A CORPORATION OF NEW YORK

METHOD AND APPARATUS FOR MEASURING ACOUSTICAL IMPEDANCES

Application filed February 19, 1929. Serial No. 341,263.

This invention relates to methods of and apparatus for the measurement of acoustic impedance.

An object of the invention is to increase the precision with which the impedances of acoustic instruments, such as horns, can be measured, and to provide simple apparatus for this purpose.

By the acoustic impedance of a device, such as a horn, speaking tube, or other elements of a sound wave transmission system is meant the ratio of the sound wave pressure at a given point to the volumetric displacement resulting therefrom over the cross section of the sound wave channel at that point. The acoustic impedance is in general a complex quantity, corresponding to the fact that the resistance to the wave motion comprises both dissipative and wattless components.

In accordance with the invention the impedance of an acoustic device is determined by measuring the pressure at the end of an acoustic line terminated by the device, and comparing this pressure with the pressure that obtains when the line is terminated by a known acoustic impedance.

The measuring apparatus is arranged to measure the ratio of the pressure at the output end of the line to that at the input end, and thus, in effect, to measure the pressure drop between the ends of the line. For a single determination three pressure measurements in all are required, one with the device under test connected to the acoustic line, and two additional measurements with different known impedances connected to the line.

It is a feature of the method of the invention that acoustic pressures only are measured.

Another feature of the invention is that the determination of the impedance value involves only the differences of direct indications corresponding to the pressure measurements; the determination of the absolute value of the pressure is unnecessary. This is achieved by an arrangement of the apparatus whereby indications are obtained that are inversely proportional to the pressure.

Other features of the invention relate to the detail arrangements for producing, detecting and measuring the acoustic wave pressures. A constant wave pressure is obtained by means of an electro-magnetic telephone receiver operating under constant current, and the pressures involved in the impedance determinations are measured by means of a search tube and a condenser microphone or other suitable form of translating device. The pressures, which are detected by the electromotive forces they produce, are measured by balancing these electromotive forces in phase and amplitude against a constant reference E. M. F., this reference E. M. F. being proportional to the constant current in the driving receiver, and therefore to the constant impressed wave pressure.

Fig. 5 shows a side elevation of a preferred form of the acoustical measuring apparatus of the invention, the electrical circuits being omitted.

Fig. 6 shows a plan view of a portion of the same device taken below line 6—6; and Fig. 7 illustrates an enlarged sectional view on line 7—7 of a portion of the device showing important elements in greater detail.

Figure 1:
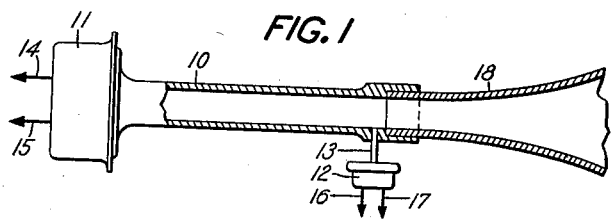
Figs. 1, 2 and 3 illustrate diagrammatically the steps in the method of measurement in accordance with the invention.
Figure 2:
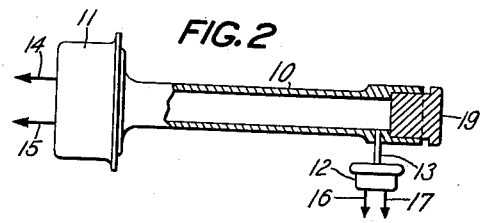
Figure 3:
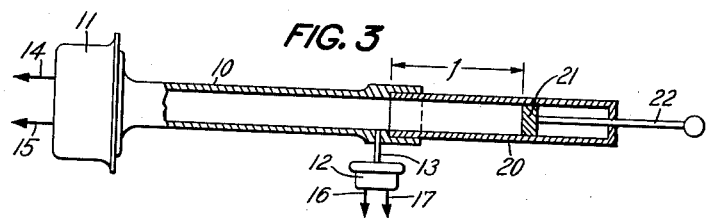

Referring to Figs. 1, 2 and 3 which illustrate schematically the three steps in the method of measurement, the essential acoustic apparatus comprises a sound conduit 10, a source 11, of sound waves connected to one end of the conduit, and a pressure measuring instrument 12, connected to the other end by a short branch tube 13. At its output end the conduit is provided with means for connecting the device to be tested and the standard acoustic impedance devices used for comparison. The wave source 11 is preferably an electro-magnetic telephone receiver, the pressure of the sound wave generated being, in this type, proportional to the alternating electric current strength in the receiver winding. The pressure detecting instrument 12 is preferably a telephone transmitter of the electrostatic type, in which an E. M. F. is generated proportional to the wave pressure on the diaphragm. In both instruments there should be a direct proportionality between the electrical input and the sound wave pressure, and vice versa. For this reason it is desirable that the instruments should not be operated at excessive wave pressures under which the diaphragm displacement would go beyond the range in which the direct proportionality exists. The connecting tube 13 should be as short as possible so that the phase of the pressure wave is not changed by transmission therethrough. Leads 14 and 15 connect the receiver 11 to a suitable source of electrical currents and to an alternating current potentiometer circuit, to be described later, to which the transmitter 12 is also connected by leads 16 and 17.

In Fig. 1 a horn 18 is shown connected to the end of the sound conduit 10. This represents the device to be tested, or the unknown impedance, the value of which will be denoted by $Z_1$. In Fig. 2 the horn is replaced by a solid plug 19, which in effect provides an infinitely great impedance. The use of an infinite impedance for one of the standards of comparison simplifies the computation of the unknown impedance from the test observations, but is not essential to the method of the invention, the only requirement being that two standards be used of different, known impedance values. In Fig. 3 an adjustable impedance standard is shown connected. This comprises a tube 20 in which a close fitting plunger 21 is adapted to slide, the position of the plunger being adjusted by means of a rod 22. The acoustic impedance of this device depends upon the wave frequency and upon the length and cross sectional area of the closed conduit. Its value at ordinary room atmospheric conditions can be calculated very accurately from the formula $$Z' = j\frac{41}{s} \tan \frac{2\pi fl}{c} \text{ c. g. s. units} \quad (1)$$

where $Z'$ denotes the impedance,
    $s$, denotes the cross sectional area of the sound passage,
    $f$, the sound wave frequency,
    $c$, the velocity of sound in air, and
    $l$, the length of the closed conduit.

The length $l$ is equal to the distance from the mouth of the tube to the face of the plunger 21, as indicated on the drawing.

The impedance $Z'$ is of non-dissipative character, that is, it is a substantially pure acoustic reactance, this being indicated by the operator $j$ in Equation (1). The value of the impedance can range from minus infinity to plus infinity, and can be adjusted to any desired value at a given frequency by varying the length $l$. The adjusting rod 22 may be graduated to indicate the length $l$ in suitable units.

Figure 4:
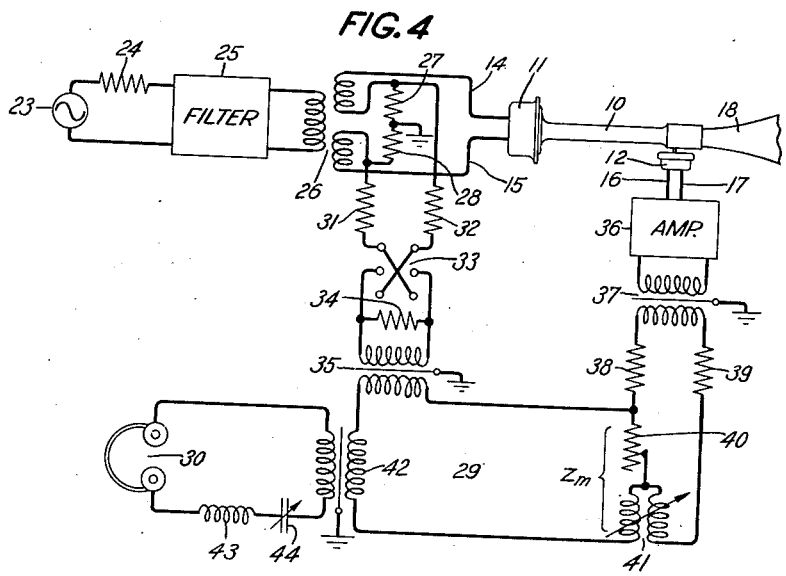
Fig. 4 illustrates schematically electrical circuit arrangements in accordance with the invention for detecting and measuring the acoustic wave pressures.

In accordance with the method of the invention the pressures at the output end of the conduit 10 are measured in terms of the wave pressure generated by the receiver 11. The ratio of these pressures is the quantity actually measured and, since a phase difference is involved, the ratio is a complex quantity requiring for its determination the measurement of a real and an imaginary component. The complete measuring system is shown schematically in Fig. 4. The electrical circuits associated with the acoustic apparatus comprise a supply circuit and a balancing circuit, the pressure ratios being measured in the latter.

The supply circuit comprises a wave source 23 connected through a controlling resistance 24 to a wave filter 25, the purpose of which is to remove any harmonics that may be present in the generated wave. The output terminals of the filter are connected through transformer 26 to the leads 14 and 15 of the receiver 11. This transformer has two equal secondary windings, between which, with their common point connected to ground, are inserted equal resistances 27 and 28. The balanced arrangement thus provided prevents the flow of stray currents to the receiver and also to the balancing circuit. Resistances 27 and 28 should be large in comparison with the electrical impedance of the receiver in order that the current in the receiver may be independent of variations in its impedance due to variations in the acoustic load thereon. Resistances 27 and 28 also serve as a means for obtaining an E. M. F. proportional to the generated sound wave pressure, since the latter is proportional to the current in the windings and, therefore, to the fall of potential across these resistances.

The balancing circuit comprises a circuit 29, in which is included a telephone receiver 30, and branch circuits by means of which E. M. F.'s proportional to the sound wave pressures are introduced. The E. M. F. proportional to the input sound pressure is introduced into circuit 29 through a circuit connected to the terminals of resistances 27 and 28 and including series resistances 31 and 32, reversing switch 33, shunt resistance 34, and shielded transformer 35. The E. M. F. proportional to the output sound wave pressure is applied to the balancing circuit through amplifier 36 connected to leads 16 and 17 of the detecting transmitter 12, and thence through shielded transformer 37, series resistances 38 and 39 to a variable coupling impedance comprising a variable resistance 40 and a variocoupler 41. Resistances 38 and 39 are large in comparison with the coupling impedance in order that the current in this part of the circuit may not be affected by the adjustment of the latter during a test. The telephone receiver 30 is coupled to circuit 29 through a shielded transformer 42 and has in series with it a tuning arrangement comprising an inductance 43 in series with a variable condenser 44. By means of the tuner the receiver circuit can be tuned to the test frequency thereby rendering it more sensitive and diminishing the general noise in the receiver. The use of shielded transformers and symmetrical circuits prevents the entrance into the receiver 30 of stray currents which would impair the accuracy of the system.

The operation of the invention will be more clearly understood from the following analysis of the principles involved:

The ratio of the pressure at the output end of the sound conduit 10 to that generated by the receiver 11 depends upon the value of the acoustic impedance in which the conduit is terminated and also upon the wave transmission properties of the conduit itself together with the acoustic impedance of the sound wave generator. These latter factors are somewhat complicated since the conduit is a line having distributed mass and elastic constants, but, at any given frequency, it may be shown that the conduit and sound generator are equivalent to a simple impedance, the value of which can be added directly to that of the terminating device, and a wave source the pressure of which is related by a constant factor to the actual generated pressure. For a given termination the acoustic system may therefore be regarded as a simple series connected arrangement consisting of a pressure source, and two impedances, the wave motion therein being subject to the ordinary relationships between wave pressure and wave velocity. Let $p_0$ and $Z_0$ be the effective input pressure and the equivalent impedance of the conduit respectively, and let $p_1$, $p_2$, and $p_3$ be the wave pressures at the output end when the conduit is terminated in the unknown impedance $Z_1$ and in two different known impedances $Z_2$ and $Z_3$ respectively. The following relationships then hold.

$$\frac{p_0}{p_1} = 1 + \frac{Z_0}{Z_1} = \rho_1 \quad (2)$$

$$\frac{p_0}{p_2} = 1 + \frac{Z_0}{Z_2} = \rho_2 \quad (3)$$

and $$\frac{p_0}{p_3} = 1 + \frac{Z_0}{Z_3} = \rho_3 \quad (4)$$

where $\rho_1$, $\rho_2$, and $\rho_3$ denote the pressure ratios. From Equations (3) and (4), by subtraction, an equation for $Z_0$ is obtained, $$Z_0 = \frac{\rho_2 - \rho_3}{\frac{1}{Z_2} - \frac{1}{Z_3}}, \quad (5)$$

which when combined with Equation (1) gives $$Z_1 = \frac{\rho_2 - \rho_3}{\frac{1}{Z_2}(\rho_1 - \rho_3) - \frac{1}{Z_3}(\rho_1 - \rho_2)}. \quad (6)$$

In this equation $Z_1$ is expressed in terms of the known impedances $Z_2$ and $Z_3$ and of the differences of the pressure ratios. If one of the known impedances is made infinitely great, $Z_2$ for example, Equation (6) becomes $$Z_1 = \frac{Z_3(\rho_3 - \rho_2)}{\rho_1 - \rho_2}. \quad (7)$$

The electrical portion of the system is designed to give indications directly proportional to the pressure ratios, thereby making it necessary to use only the differences of the test observations in the computation of the unknown impedance. The fact that the absolute magnitudes of the wave pressures, or even the absolute values of the pressure ratios, need not be determined enables a high degree of precision to be attained.

It is to be noted also that Equations 6 and 7 involve the pressure differences as ratios, which also makes for accuracy.

The determination of the pressure ratios is effected by the balancing of two E. M. F.'s against each other in the electrical circuit, one related to the input sound pressure $p_0$ by a constant factor, and the other derived from the output sound pressure. These E. M. F.'s are introduced into the balancing circuit 29 in the manner already explained. The E. M. F. corresponding to the sound input is directly proportional to the current in the windings of the sound generator 11, and therefore to the effective input pressure $p_0$. The E. M. F. generated in transmitter 12, corresponding to the output sound pressure is first amplified to bring it to a usable value and is then impressed on the circuit composed of resistances 38 and 39 and the variable coupling devices 40, 41. Since resistances 38 and 39 are large in comparison with the impedance of the coupling device, the current in this circuit is directly proportional to the output sound pressure and is not appreciably affected by adjustments of the coupling device. If the value of this current be denoted by I and the mutual impedance between the above mentioned circuit and the balancing circuit be denoted by $Z_m$, the E. M. F. induced thereby in the balancing circuit is equal to $IZ_m$. This E. M. F. can be varied in amplitude and in phase by adjustments of variable resistance 40 and variocoupler 41, and thus can be made to balance the E. M. F. corresponding to input sound pressure. The balance condition, which is detected by the absence of tone in receiver 30, is represented by $$E_0 = kp_0 = IZ_m = k'Z_m p,$$

or $$Z_m = \frac{k}{k'} \cdot \frac{p_0}{p} \quad (8)$$

where $E_0$ is the E. M. F. corresponding to the input sound pressure, $k$ and $k'$ are constants relating the E. M. F. $E_0$ and the current $I$ to the corresponding sound pressures, and $p$ denotes the output sound pressure for any given condition. The mutual impedance $Z_m$, at balance, is thus proportional to the pressure ratio and is inversely proportional to the output pressure. If now the circuit is balanced successively with acoustic impedances $Z_1$, $Z_2$, and $Z_3$ in accordance with the steps outlined above, corresponding values of the mutual impedance $Z_{m1}$, $Z_{m2}$, and $Z_{m3}$ will be found, which, when inserted in Equations (6) and (7) by means of Equation (8), give $$Z_1 = \frac{Z_{m2} - Z_{m3}}{\frac{1}{Z_2}(Z_{m1} - Z_{m3}) - \frac{1}{Z_2}(Z_{m1} - Z_{m2})}, \quad (9)$$

and, for $Z_2$ infinitely great, $$Z_1 = \frac{Z_3(Z_{m3} - Z_{m2})}{(Z_{m1} - Z_{m2})}. \quad (10)$$

These equations, give the unknown acoustic impedance in terms of the known standards and of the differences of the mutual impedances in the balancing circuit.

The mutual impedance $Z_m$ is made up of two components, a resistance $r$, due to variable resistance 40, and a reactance, $2\pi fM$, due to the mutual inductance $M$ between the coils of the variocoupler 41. The difference of two mutual impedances is simply the difference of the resistance components plus the difference of the reactances, as determined from the scale readings of the devices 40 and 41. It will be seen from a comparison of Equations 6 and 9, that the fact that the differences of the mutual impedances are alone involved follows from the fact that these impedances are inversely proportional to the output pressures, this being due to the arrangement of the circuits whereby the variable coupling device is operative upon the E. M. F. corresponding to the output pressure. Balancing could equally well be effected by inserting the variable coupling between transformer 35 and circuit 29, but this would lead to a more complicated expression for the unknown impedance, involving the absolute magnitudes of the pressure ratios, which are more difficult to determine precisely.

The variable coupling device is limited in its range of adjustment of a phase change of 180°, but this range may be effectively extended to 360° by means of reversing switch 33, which when operated changes the phase of the E. M. F. $E_0$ by 180°.

Figs. 5, 6, and 7, illustrate a preferred construction of the acoustic portion of the invention the apparatus being arranged to facilitate the interchanging of the terminal impedances at the end of the sound conduit 10 in the course of a test. The elements comprising the sound generator 11, the sound conduit 10 and the pressure detector 12 are grouped together in a unit, which is pivotally mounted so that the sound conduit can be swung horizontally to engage successively the device to be tested and the impedance standards, these latter being mounted side by side on a fixed base which also carries the pivoted unit.

Referring to Figs. 5 and 6, which show respectively a side elevation of the apparatus and a plan view of the portion to the right of line 6—6, base 45 carries, by means of brackets 46 a face-plate 47, adapted to receive the device to be tested and also the standards of acoustic impedance. A sub-base 48 pivotally mounted on 45 by stud bolt 49 and bushing 54, carries the sound conduit 10, sound source 11, and a coupling head 50 in which the pressure detector is mounted. The sound conduit is carried in pedestal bearings 51 which are provided with bushings 52 of sponge rubber or other sound absorbing material to prevent the transmission of sound vibrations from the walls of the conduit to the base. To prevent the transmission of vibrations along the walls of the conduit from the sound source, the conduit is divided into two parts which are coupled together by a piece of flexible rubber tubing 53. A sponge rubber cushion 65 supports the receiver and at the same time insulates it acoustically from the sub-base. A slide 55 attached to the base 45 supports the unbalanced weight at the receiver end of the sub-base.

The coupling head 50 is drilled through to continue the sound passage to its outer face with the same diameter as in the conduit 10. The outer face bears tightly against the rear face of plate 47 and is adapted to slide laterally thereover, both faces being cylindrically curved and centered on the axis of pivot 49 so that they remain in close engagement as the base 48 is rotated. Guides 56 attached to the top and bottom of plate 47 hold the end of the conduit in horizontal alignment. The faces of the plate 47 and the head 50 are kept in close engagement by curved clamping strips 57 which are pressed against flanges at the top and at the bottom of the head 50 by springs 58 which abut against inwardly pointing flanges on the guides 56. In Fig. 6 the upper guide plate has been removed to show more clearly the details of the coupling head and face plate, and in Fig. 7 an enlarged view of the section along the line 7—7, the construction of this portion is shown in greater detail.

The face plate 47 is drilled with two horizontally spaced holes of the same diameter as the sound passage in conduit 10 and at the same height above base 45. One hole is adapted by screwed bushing 59 to receive the adjustable acoustic standard comprising tube 20, plug 21 and adjusting rod 22, the outer end of the tube being supported from base 45 by bracket 60. The rod 22 is graduated to indicate the effective length of the closed air column in the tube 20. The other hole is provided with a screwed bushing 61 to receive the device to be tested. The hole in this bushing and the corresponding aperture in the face plate is of the same diameter as the main sound passage, but, as shown in Fig. 7, the face plate is deeply recessed so that when devices having smaller sound passages are to be tested, special bushings or adapters can be used in place of 61 to carry the smaller sound passage back almost to the face of coupling head 50.

The coupling head 50 has its sides bevelled, one of the bevelled sides having a threaded recess into which the shell of the pressure detecting transmitter 12 is screwed. From the centre of the base of the recess to a point in the main sound passage very close to the face of coupling head, a small hole less than one sixteenth of an inch in diameter is drilled to transmit the wave pressure to the detector diaphragm. A rubber washer 62, between the shell of the detecting transmitter and the base of the recess provides an effective acoustic seal. The detecting transmitter preferably has a very small diameter, little more than an inch, to enable it to be mounted in the coupling head and thereby to shorten the length of the passage between it and the main sound conduit. In its general construction it can follow the usual construction for electrostatic transmitters, the lack of sensitivity due to its small size being readily compensated by amplification.

Stop pins 63 let into the curved face of plate 47 limit the travel of the coupling head and facilitate the registering of the sound conduit 10 with the holes in the face plate. Guide pins 64, which loosely engage the clamping plates 57 and which fit tightly into holes in the flanges of guide plates 56 serve to hold the clamping plates in their proper position and to carry the clamping springs 58. The electrical circuits are connected to leads 14, 15, 16 and 17, which are correspondingly numbered in Fig. 4.

In making a measurement with the device described above, the device to be tested is connected to the bushing 61, or to a suitable adapter, and the standard impedance is adjusted to a convenient finite value corresponding to the frequency used. Preferably the adjustment should be such that the factor $$\frac{2\pi fl}{c}$$

in Equation (1) is equal to unity, since for this adjustment the impedance is least affected by errors in the setting. The length of the closed column is then equal to one eighth of the length of the sound wave. The sound conduit 10 is then turned to register with the device under test, an electrical balance is made in the manner already described, and the corresponding reading of the mutual impedance $Z_{m1}$ recorded. The sound conduit is next swung to a central position, the sound conduit being then completely closed by face-plate 47, thus giving an infinite impedance termination. A second balance is effected and the mutual inductance $Z_{m2}$ noted. A third balance is made with the sound conduit registering with the standard finite impedance, and the corresponding mutual inductance $Z_{m3}$ noted. The impedance of the device may then be computed from Equation 10, the impedance $Z_3$ being the acoustic impedance of the adjustable standard.

What is claimed is:

1. The method of measuring the impedance of an acoustic device which comprises measuring the ratio of the pressure at the output end of a sound conduit to the pressure at the input end when the conduit is terminated successively by the device to be tested and by two known acoustic impedances of different values, the impedance of the said device being computed from the differences of the pressure ratios so obtained.

2. The method in accordance with claim 1 which includes the steps of producing electromotive forces proportional to said input pressure and said output pressure respectively and balancing said E. M. F.'s against each other to ascertain the value of the pressure ratio.

3. The method in accordance with claim 1 which includes the steps of producing an E. M. F. bearing a fixed relation to the pressure at the input end of the conduit, producing a second E. M. F. proportional to the pressure at the output end, combining said E. M. F.'s to produce an indication of their difference, and varying said second E. M. F. in phase and in amplitude to reduce the difference to zero.

4. Apparatus for the measurement of acoustic impedance comprising a sound conduit, a sound wave source coupled to one end of said conduit, means for measuring the wave pressure impressed on said conduit by said source, means for measuring the wave pressure at the output end of said conduit, a member having mounted thereon a plurality of acoustic impedance devices of known impedance values and means for mounting a device to be tested, and means for coupling the output end of said conduit acoustically to said known impedances and the device to be tested successively.

5. Apparatus in accordance with claim 4 in which the said member carrying the acoustic impedance standards comprises a cylindrically curved plate having horizontally spaced apertures for the attachment of the impedance devices, and in which the sound conduit and the wave source are pivotally mounted whereby the coupling of the sound conduit to the several impedance devices is effected by rotating the sound conduit and the wave source together with respect to said curved plate.

6. Apparatus in accordance with claim 4 in which one of the known impedance devices comprises a closure for the output end of said conduit, corresponding to an infinitely great acoustic impedance, and in which another of the known impedance devices comprises a closed tube in which the length of the enclosed air column is adjustable.

7. Apparatus for the measurement of acoustical impedance comprising a sound conduit, a sound wave source coupled to the input end of said conduit, means for measuring the ratio of the wave pressure impressed upon said conduit by said source to the wave pressure at the output end of said conduit and means for coupling the output end of said conduit successively to a plurality of acoustical impedance devices including the device to be tested.

In witness whereof I hereunto subscribe my name this 15th day of February, 1929.

PAUL B. FLANDERS.